(12) United States Patent
Posamentier

(10) Patent No.: US 7,911,323 B2
(45) Date of Patent: Mar. 22, 2011

(54) RADIO FREQUENCY IDENTIFICATION (RFID) TAG RESPONSE MODULATION

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 11/540,012

(22) Filed: Sep. 29, 2006

(65) Prior Publication Data

US 2008/0079579 A1 Apr. 3, 2008

(51) Int. Cl.
*H04Q 5/22* (2006.01)

(52) U.S. Cl. .................. 340/10.1; 340/10.4; 340/10.3; 340/572.4; 340/572.1

(58) Field of Classification Search ............. 340/57.1, 340/572.2, 568.1, 116, 331, 367, 10.1, 10.2, 340/10.3, 572.1, 572.4, 10.4
See application file for complete search history.

(56) References Cited

U.S. PATENT DOCUMENTS

| | | | |
|---|---|---|---|
| 5,940,006 A * | 8/1999 | MacLellan et al. | 340/10.1 |
| 6,211,781 B1 * | 4/2001 | McDonald | 340/505 |
| 6,340,932 B1 * | 1/2002 | Rodgers et al. | 340/572.7 |
| 6,958,677 B1 * | 10/2005 | Carter | 340/10.1 |
| 6,995,655 B2 * | 2/2006 | Ertin et al. | 340/10.2 |
| 7,053,754 B2 * | 5/2006 | Mani | 340/10.2 |
| 7,075,412 B1 * | 7/2006 | Reynolds et al. | 340/10.2 |
| 7,274,284 B2 * | 9/2007 | Dressen | 340/10.2 |
| 7,304,579 B2 * | 12/2007 | Diorio et al. | 340/572.4 |
| 7,355,962 B2 * | 4/2008 | Li et al. | 370/208 |
| 2004/0066281 A1 * | 4/2004 | Hughes et al. | 340/10.2 |
| 2007/0257790 A1 * | 11/2007 | Hershkovitz | 340/528 |
| 2008/0150692 A1 * | 6/2008 | Missimer et al. | 340/10.1 |

* cited by examiner

*Primary Examiner* — Daniel Wu
*Assistant Examiner* — Rufus Point
(74) *Attorney, Agent, or Firm* — Lee & Hayes, PLLC

(57) ABSTRACT

Embodiments of radio frequency identification (RFID) tag response modulation are described.

11 Claims, 5 Drawing Sheets

RADIO FREQUENCY IDENTIFICATION (RFID) TAG RESPONSE MODULATION

BACKGROUND

The pervasiveness of radio frequency identification (RFID) tags is ever increasing. For instance, RFID tags may be used to track inventory such as products in a store and even livestock at a farm. However, as this pervasiveness increases, interference caused by the RFID tags with each other may also increase. For example, a response transmitted by one RFID tag may interfere with a response transmitted by another RFID tag, which may result in inaccuracies when reading the tags, missed readings altogether due to tag collisions, and so on. Further, this interference may be increased as the number of RFID tags in range of a device that reads the tags is increased. Therefore, the pervasiveness of the RFID tags may diminish the functionality of the RFID tags in a given location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform radio frequency identification (RFID) tag response modulation techniques. Exemplary procedures are then described that may be employed in the exemplary environment, as well as in other environments.

Exemplary Environment

Figure 1:
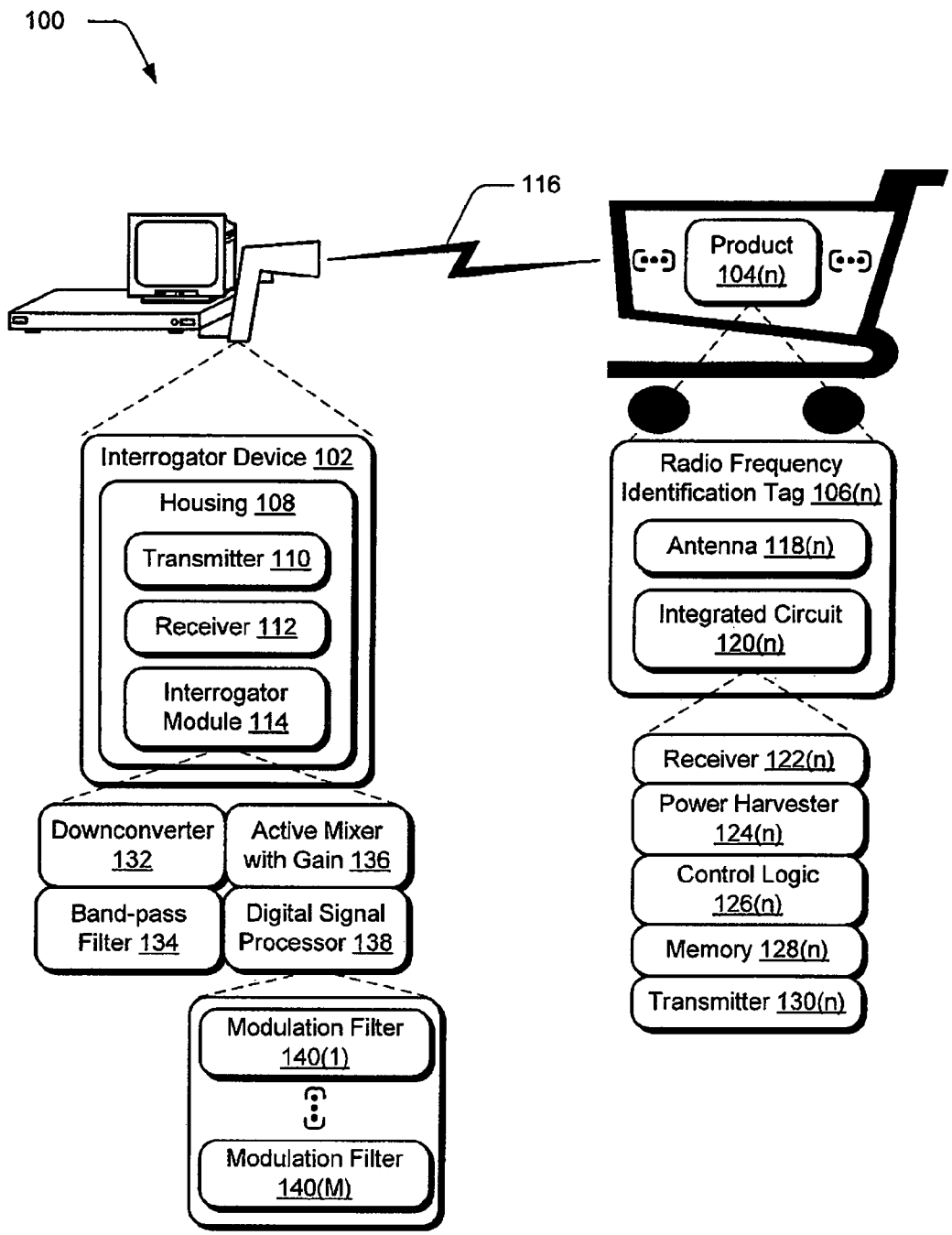
FIG. 1 is an illustration of an environment in an exemplary implementation that is operable to employ techniques to perform radio frequency identification (RFID) tag response modulation.

FIG. 1 is an illustration of an environment 100 in an exemplary implementation that is operable to employ techniques to perform radio frequency identification (RFID) tag response modulation. The illustrated environment 100 includes an interrogator device 102 and one or more products 104(n) (where "n" can be any integer from one to "N"), each having an associated radio frequency tag 106(n), which may also be known as a "transponder". Because the product 104(n) may be representative of one or more products, in portions of the following discussion reference may be made to the product 104(n) in singular form to indicate a particular product or in plural form (e.g., products 104(n), the plurality of products 104(n), and so). Likewise, items associated with the product 104(n) may use a similar convention, e.g., radio frequency tag 106(n), the plurality of radio frequency tags 106(n), and so on.

The products 104(n) may be configured in a variety of ways, such as books, groceries, and other items typically sold in a "brick and mortar" store, livestock, parts, packages to be delivered by a service, and so on. Each of the products 104(n), as illustrated, includes at least one radio frequency identification (RFID) tag 106(n), which may include data that pertains to the respective product 104(n).

The environment 100 as illustrated includes an interrogator device 102 which is representative of a device that reads data from the radio frequency identification tags 106(n). The illustrated interrogator device 102 includes a housing 108 that incorporates a transmitter 110, a receiver 112, an interrogator module 114 and a display device. The display device, for instance, may be used to display data that pertains to reading of the RFID tag 106(n), such as data from the tag itself, operational status of the interrogator device 102 when reading the tag, and so on.

The interrogator module 114 is representative of functionality to manage interaction of the interrogator device 102 with the RFID tags 106(n). For example, the interrogator module 114 may form a request to be transmitted by the transmitter 110 over a wireless medium 116 to the RFID tag 106(n), such as a medium provided through radio frequency communication. The RFID tag 106(n) may then receive the request via an antenna 118(n) and process the request using an integrated circuit 120(n).

The integrated circuit 120(n), for instance, may include a receiver 122(n) to receive the request from the antenna 118(n). The integrated circuit 120(n) may also include a power harvester 124(n) which is representative of functionality to harvest power from a transmission made by the transmitter 110 of the interrogator device 102, which may be used to perform the processing by the integrated circuit 120(n) including transmission of a response back to the interrogator device 102. Thus, in this instance the RFID tag 106(n) is a "passive" tag in that the tag does not include an internal power source itself, but instead uses power from an "outside" (i.e., non-integral) source.

In another instance, however, the RFID tag 106(n) may be configured as an active tag having an internal power source, e.g., such as a tag used in a car toll system with an integrated battery. A variety of other instances are also contemplated. Thus, the RFID tag 106(n) may be representative of a variety of tags, such a factory-programmable read-only passive tags (also known as "Class Zero" tags); passive tags having preprogrammed headers with a serial number that is programmable by an end user (also known as "Class One" tags); passive tags with read/write and encryption capabilities (also known as "Class Two" tags); semi-passive tags that support broadband communication (also known as "Class Three" tags); active tags that may be capable of broadband peer-to-peer communication with other tags and with interrogator devices (also known as "Class Four" tags); and so on.

The illustrated RFID tag 106(n), and more particularly the integrated circuit 120(n), may also include control logic 126(n) and memory 128(n). The memory 128(n) may be representative of a wide variety of volatile and non-volatile memory, including combinations thereof. The control logic 126(n) is representative of functionality to process requests from the interrogator device 102 to cause a response to be transmitted back to the interrogator device 102. The control logic 126(*n*), for example, may perform one or more operations based on a request, such as to retrieve and process data from memory 128(*n*). Additionally, the control logic 126(*n*) may be configured to control transmission of responses back to the interrogator device 102 by the transmitter 130(*n*), such as control use of a particular timeslot, use of a particular modulation mode, and so on, further discussion of which may be found in relation to FIG. 2. The response may then be transmitted back over the wireless medium 116 to the interrogator device 102 using the transmitter 130(*n*), such as by using power harvested by the power harvester 124(*n*) from the transmitter 110 of the interrogator device 102.

The interrogator device 102 may then use the interrogator module 114 to process responses received from one or more RFID tags 106(*n*). The interrogator module 114, for instance, may include reception functionality that includes a downconverter 132, a band-pass filter 134, an active mixer with gain 136 and a digital signal processor 138. The downconverter 132, for instance, may be used to lower a frequency of the response received from the RFID tag 106(*n*), a result of which is provided to the band-pass filter 134, which may the filter supported modulation modes. The output of the band-pass filter 134 may be provided to an active mixer with gain 136, an output of which may be given to a digital signal processor 138 to be processed by a plurality of modulation filters 140(1)-140(M) to obtain data modulated at different rates from the signal. It should be readily apparent that the reception functionality is but one example and is not exhaustive of components that may be used, e.g., a analog/digital converter may also be used, components may be incorporated within the digital signal processor 138, and so on.

As previously described, a plurality of responses may be received from the plurality of RFID tags 106(*n*) to reply to a single request to provide data, which may result in "collisions" in the responses and lost data on the part of the interrogator device 102. A technique that may be used to minimize collisions involves use of a random timeslotted approach where a "Q" value is determined during the start of a tag inventory round. This "Q" value may represent "$2^Q$" available timeslots which are available to receive responses. Therefore, as inventory proceeds, the RFID tags 106(*n*) tags (through use of the control logic 126(*n*)) may each randomly pick a timeslot value, in which, to respond.

In an implementation, this selection of timeslots by the RFID tags 106(*n*) may change during each inventory round. Additionally, the Q value may be optimized to address a contemplated number of RFID tags 106(*n*) within range of the interrogator device 102, but may be limited such that the number of timeslots does not consume an inordinate amount of time, e.g., caused by waiting for the interrogator device 102 to progress through each of the timeslots defined by Q.

Further, the interrogator device 102 may employ response modulation techniques such that different RFID tags 106(*n*) may use different modulation techniques when transmitting a response, thereby "expanding" the number of responses that may be received by the interrogator device 102 at a point in time. In this way, the Q value may be configured in two dimensions, further discussion of which may be found in relation to the following figure.

Figure 2:
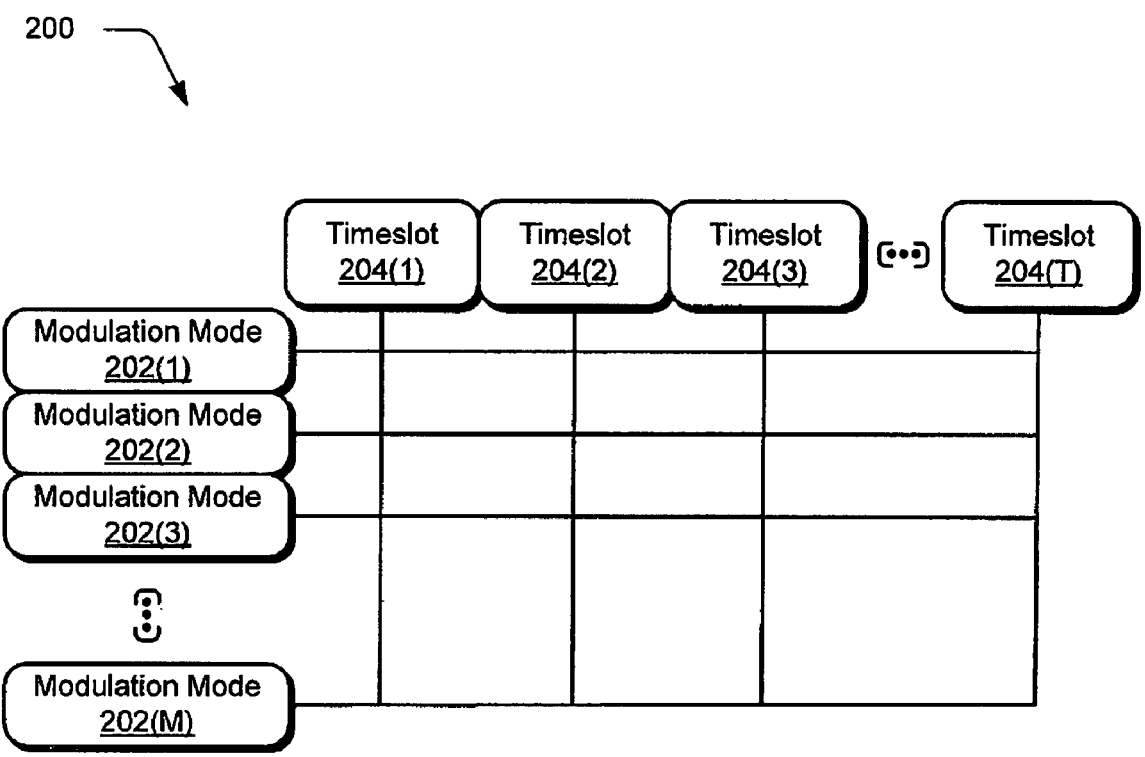
FIG. 2 depicts a table in an exemplary implementation showing available timeslots and modulation modes supported by an interrogator device of FIG. 1 to receive responses from RFID tags.

FIG. 2 depicts a table 200 in an exemplary implementation showing available timeslots and modulation modes supported by the interrogator device 102 of FIG. 1 to receive one or more responses from the RFID tags 106(*n*). The table 200 includes a plurality of modulation modes 202(1), 202(2), 202(3), . . . , 202(M) and a plurality of timeslots 204(1), 204(2), 204(3), . . . , 204(T). Each of the modulation modes 202(1)-202(M) represents different modulation techniques that may be employed to transmit a response such that responses received in a same timeslot are discernable by the interrogator device 102.

For example, timeslots 204(1)-204(T) may represent timeslots that may be chosen randomly by the RFID tag 106(*n*) to respond to the interrogator device 102, which may be defined by the "Q" value as previously described. Another component of the Q value may also be defined which specifies a number of modulation modes supported by the interrogator device 102. Thus, the modulation modes 202(1)-202(M) in conjunction with the timeslots 204(1)-204(T) may define a "two-dimensional Q" as illustrated by the line intersections in the table 200 of FIG. 2. Thus, a number of collisions may be reduced as RFID tags 106(*n*) that happen to choose the same Q timeslot may still choose different Q modulation modes and hence still be resolvable by the interrogator device 102.

Demodulation of responses received in the different modulation modes 202(1)-202(M) may be performed in a variety of ways. For example, modulation filters 140(1)-140(M) may be executed in parallel by the digital signal processor 138, each of which corresponding to a respective one of the modulation modes 202(1)-202(M). Thus, an amount of time taken to process (e.g., demodulate) responses from the RFID tags 106(*n*) may approximate that used to demodulate responses received in separate timeslots 204(1)-204(T) without using the response modulation techniques. Further discussion of modulation techniques may be found in relation to the following exemplary procedures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices. The features of the response modulation techniques described below are platform-independent, meaning that the techniques may be implemented on a variety of commercial computing platforms having a variety of processors.

Exemplary Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the table 200 of FIG. 2.

Figure 3:
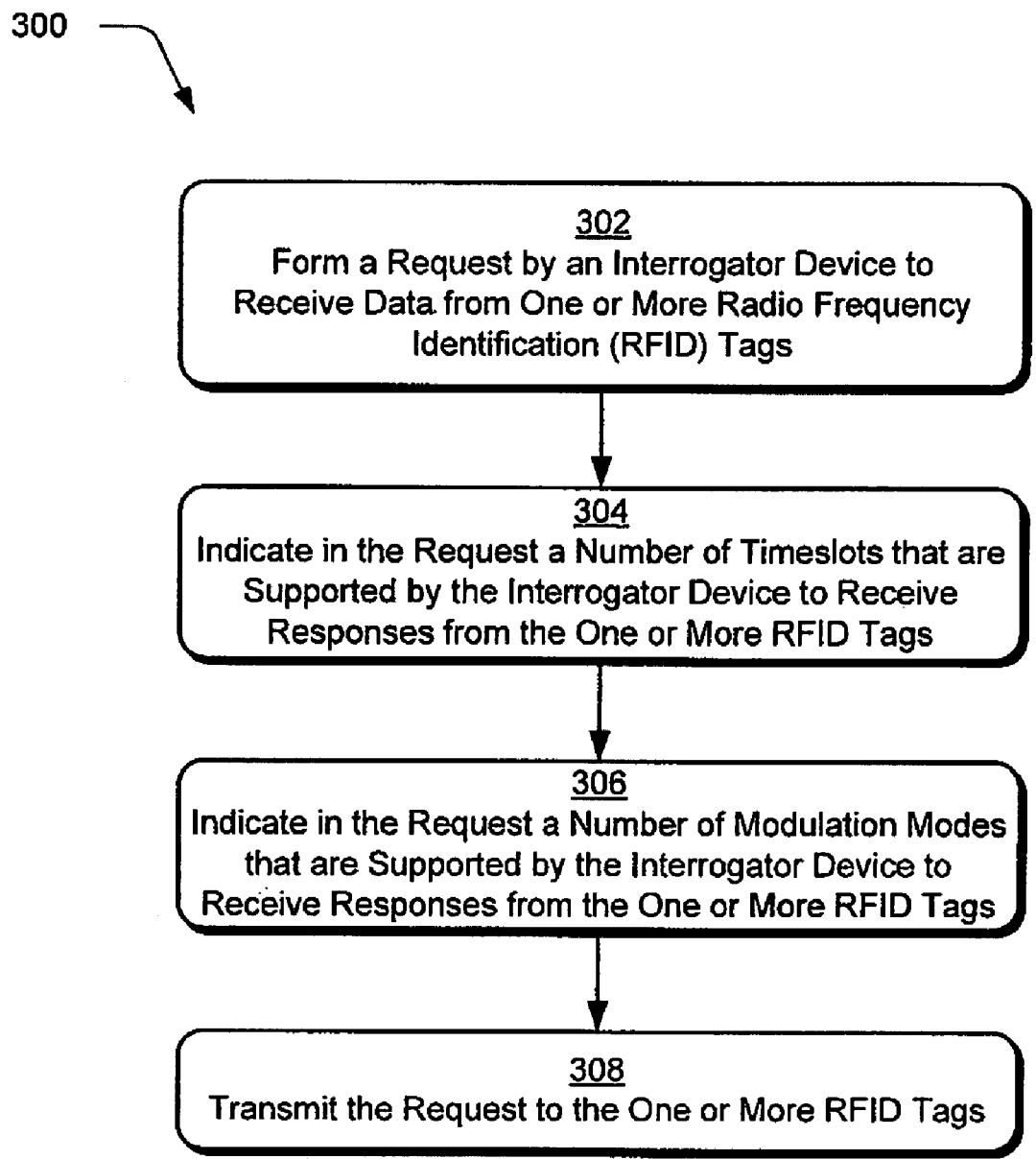
FIG. 3 is a flow diagram depicting a procedure in an exemplary implementation in which a request is formed by an interrogator device that includes an indication of a number of timeslots and a number of modulation modes that are supported by the interrogator device.

FIG. 3 depicts a procedure 300 in an exemplary implementation in which a request is formed by an interrogator device that includes an indication a number of timeslots and a number of modulation modes that are supported by the interrogator device. A request is formed by an interrogator device to receive data from one or more radio frequency identification (RFID) tags (block 302). The request, for instance, may be configured to interrogate to RFID tags to determine data stored on the RFID tags.

An indication is also placed within the request that specifies a number of timeslots that are supported by the interrogator device to receive responses from the one or more RFID tags (block 304). For example, the indication may be a first part of a Q value that specifies a number of timeslots as "$2^Q$". A variety of other examples are also contemplated.

An indication is placed within the request that specifies a number of modulation modes that are supported by the interrogator device to receive responses from the one or more RFID tags (block 306). For example, the indication of modulation modes may be configured similarly to the indication of timeslots. Therefore, both indications may be used to construct a two-dimensional Q value as shown in the table 200 FIG. 2. The request may then be transmitted to the one or more RFID tags (block 308), such as by using the transmitter 110 of the interrogator device 102 to transmit the request over the wireless medium 116 to the RFID tags 106(n) for processing, further discussion of which may be found in relation to the following figure.

Figure 4:
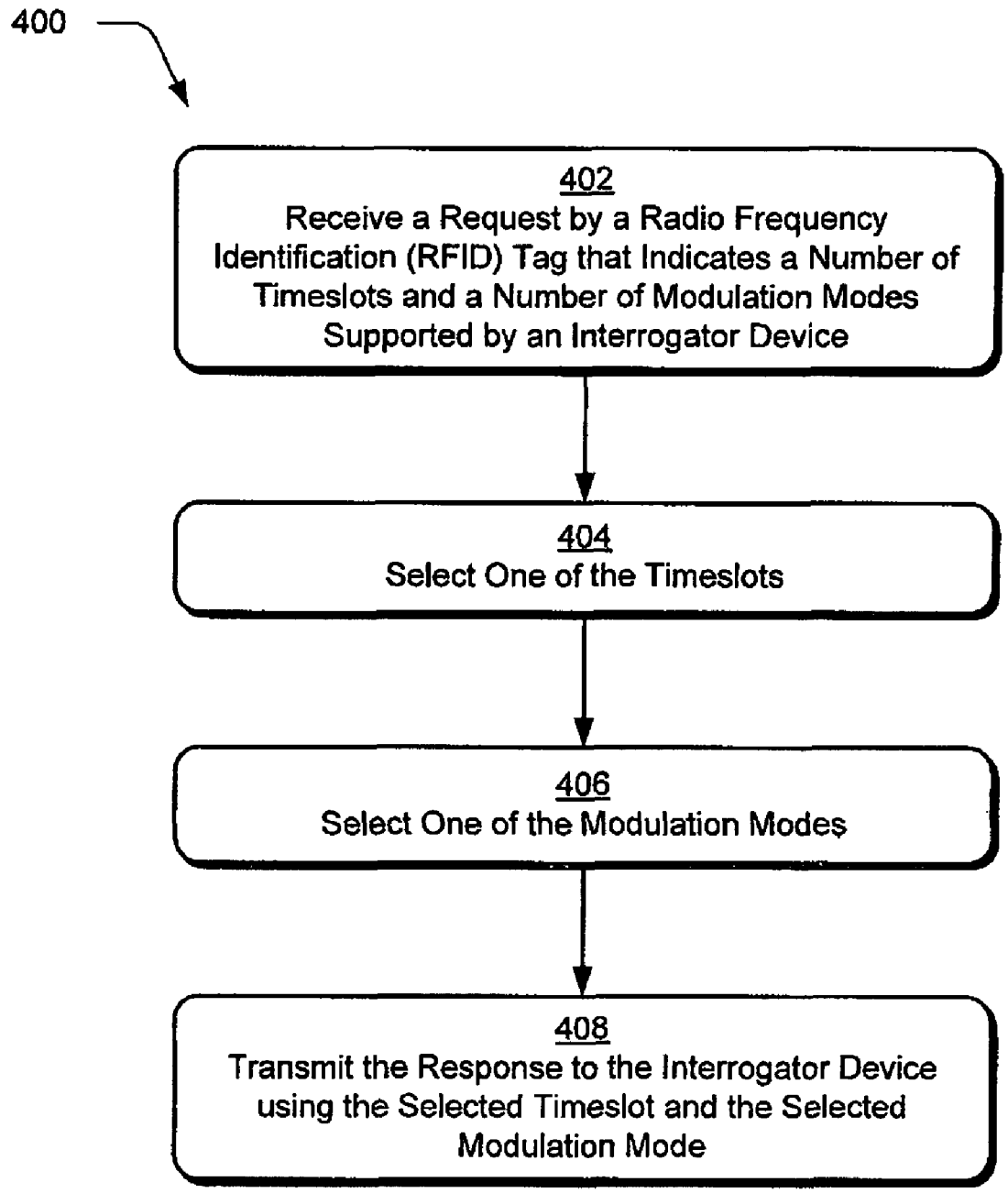
FIG. 4 is a flow diagram depicting a procedure in an exemplary implementation in which an RFID tag receives and processes the request formed by the procedure of FIG. 3 and transmits a response to the request to the interrogator device.

FIG. 4 depicts a procedure 400 in an exemplary implementation in which a radio frequency identification (RFID) tag receives and processes the request formed by the procedure 300 of FIG. 3 and transmits a response to the request to the interrogator device. A request is received by a radio frequency identification tag that indicates a number of timeslots and a number of modulation modes supported by an interrogator device (block 402).

One of the timeslots are selected (block 404) by the RFID tag. For example, control logic 126(n) of the RFID tag 106(n) may randomly select from the number of timeslots indicated by the request, such as through random number generation in a range defined by the indicated number.

One of the modulation modes is also selected (block 406). The RFID tag, for instance, may include an ordered list of modulation modes. Therefore, the number of modulation modes may reference an initial portion of the list that corresponds to the number. In another instance, the request may reference specific modulation modes, with the number of references indicating the number of modulation modes supported. The control logic 126(n) of the RFID tag 106(n) may then randomly selected from this number. A variety of other instances are also contemplated.

The response is transmitted to the interrogator device using the selected timeslot and the selected modulation mode (block 408). The control logic 126(n), for instance, may form the response and "wait" for the selected timeslot to transmit the response using the selected modulation mode by the transmitter 130(n). The interrogator device 102 may then process a plurality of responses sent using similar techniques, an example of which is discussed in relation to the following figure.

Figure 5:
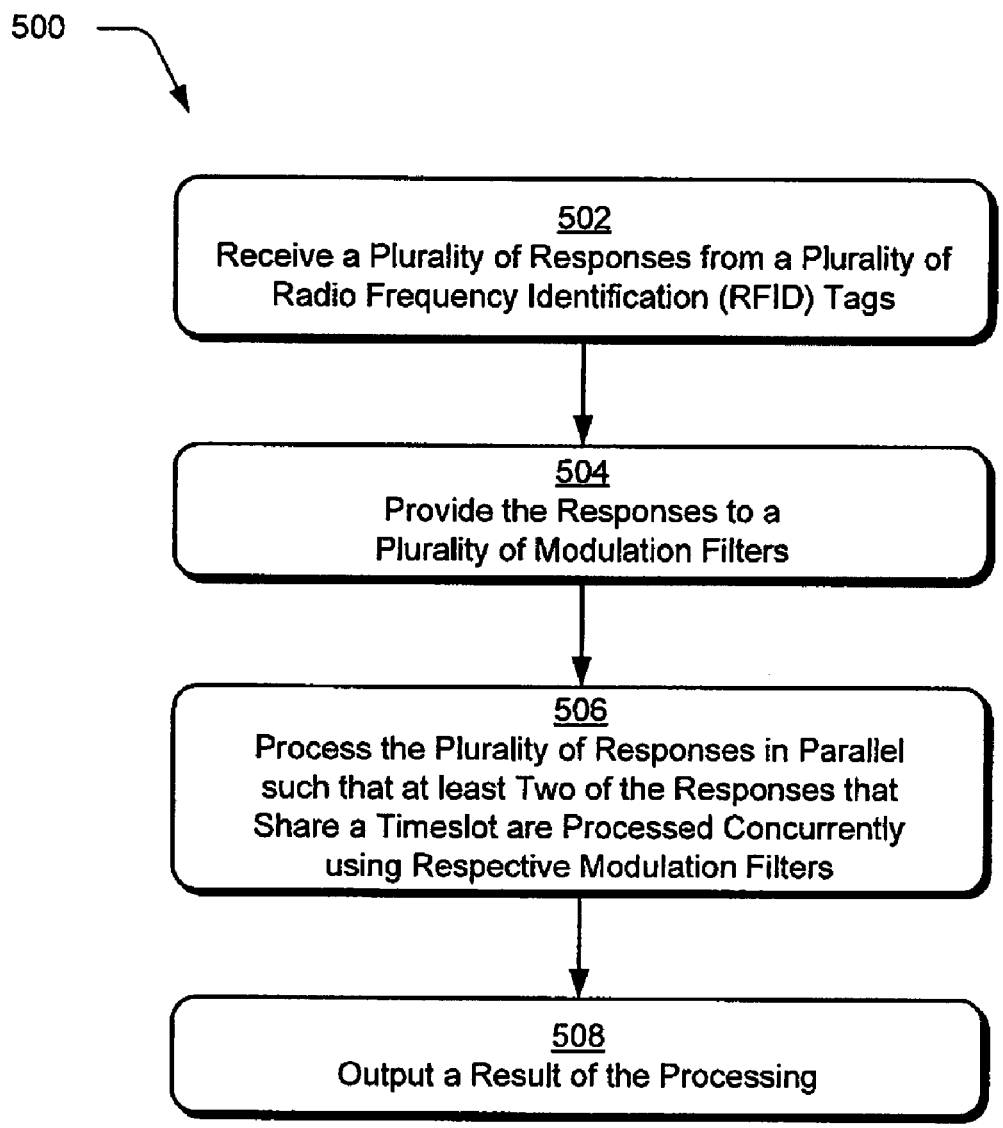
FIG. 5 is a flow diagram depicting a procedure in an exemplary implementation in which the interrogator device of FIG. 3 receives and processes the response formed in FIG. 4 by the RFID tag to the request formed in FIG. 3.

FIG. 5 depicts a procedure 500 in an exemplary implementation in which the interrogator device of FIG. 3 receives and processes the response formed in FIG. 4 by the RFID tag to the request formed in FIG. 3. A plurality of responses is received from a plurality of radio frequency identification (RFID) tags (block 502).

The responses are provided to a plurality of modulation filters (block 504) as received. For example, one more of the responses may be transmitted in different timeslots selected by the RFID tags as previously described in relation to FIG. 4.

The plurality of responses are processed in parallel such that at least two of the responses that share a timeslot are processed concurrently using respective modulation filters (block 506) which are then output (block 508). For example, the interrogator module 114 may employ a digital signal processor 138 that executes a modulation filter 140(1)-140(M) corresponding to each modulation mode. Therefore, a first response transmitted accordingly to a first modulation technique does not collide (e.g., interfere) with a second response transmitted using a second modulation technique. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus for interrogating radio frequency identification (RFID) tags, a reader comprising:
a transmitter; and
a module to form a request to be transmitted by the transmitter, the request to indicate a number of timeslots and a number of modulation modes supported by the module to process within the apparatus one or more responses to the request from a number of RFID tags, wherein the number of timeslots and the number of modulation modes are optimized by the apparatus, based upon an Q value that addresses the number of RFID tags within the apparatus, and the value $2^Q$ represents the available timeslots to receive responses from the RFID tags;
wherein each RFID tag comprises a control logic to:
randomly select one of a plurality of modulation modes, wherein the randomly selected modulation modes is selected from an optimized range of modulations modes indicated in the request, received, wherein each said modulation mode corresponds to a particular data transfer rate and wherein the optimized range of modulation modes is determined based upon the known number of radio frequency identification (RFID) tags; and
form a response to the request to be transmitted.

2. An apparatus as described in claim 1, wherein each said modulation mode corresponds to a particular data transfer rate.

3. An apparatus as described in claim 1, wherein the request is to configure the one or more radio frequency identification (RFID) tags to select a respective said timeslot and a respective said modulation mode and to transmit a respective said response using the selected said times lot and the selected said modulation mode.

4. An apparatus as described in claim 1, wherein at least one said radio frequency identification (RFID) tag is a passive tag such that a respective said response is formed, at least in part, using power harvested from the transmitter.

5. An apparatus as described in claim 1, wherein the module includes a plurality of modulation filters to demodulate the response.

6. An apparatus as described in claim 5, wherein the plurality of modulation filters are executable in parallel.

7. An apparatus as described in claim 5, wherein the module includes a digital signal processor to execute the modulation filters in parallel.

8. A radio frequency identification (RFID) tag comprising:
a receiver;
a power harvester to harvest power from a request received by the receiver;
a transmitter;
and control logic to:
randomly select one of a plurality of timeslots, wherein the randomly selected timeslots is selected from an optimized range of timeslots indicated in the request received, wherein the optimized range of timeslots is determined within the RFID tag based upon a number of RFID tags in an interrogation zone, based upon a Q value that addresses the number of RFID tags within the apparatus, and the value $2^Q$ represents the available timeslots to receive responses from the RFID tags;

randomly select one of a plurality of modulation modes, wherein the randomly selected modulation modes is selected from an optimized range of modulations modes indicated in the request received, wherein each said modulation mode corresponds to a particular data transfer rate and wherein the optimized range of modulation modes is determined based upon the known number of RFID tags; and form a response to the request to be transmitted by the transmitter in the selected said timeslot using the selected said modulation mode, the response being formed at least in part from power harvested by the power harvester.

9. An RFID tag as described in claim 8, wherein the RFID tag is associated with a product; and the control logic is to return an identification of the product in the response.

10. An interrogator device comprising:

a transmitter within an interrogator device to transmit a request to a number of radio frequency identification (RFID) tags, wherein the request indicates a number of the timeslots and a number of the modulation modes supported by the module, wherein the number of timeslots and the number of modulation modes are optimized by the interrogator device, based upon the known number of radio frequency identification RFID tags within the interrogator device, based upon a Q value that addresses the number of RFID tags within the interrogator device, and the value $2^Q$ represents the available timeslots to receive responses from the RFID tags;

a receiver within the interrogator device to receive a plurality of responses to the request from the known number of radio frequency identification (RFID) tags;

a module within the interrogator device to execute a plurality of modulation filters in parallel to process the plurality of responses received in a plurality of timeslots;

wherein each RFID tag comprises a control logic to:

randomly select one of a plurality of modulation modes, wherein the randomly selected modulation modes is selected from an optimized range of modulations modes indicated in the request, received, wherein each said modulation mode corresponds to a particular data transfer rate and wherein the optimized range of modulation modes is determined based upon the known number of radio frequency identification (RFID) tags; and form a response to the request to be transmitted;

and a display device of the interrogator device to display a result of the processing.

11. A system as described in claim 10, wherein each said response is received in a respective said timeslot using a respective said modulation mode that is selected by a respective said radio frequency identification (RFID) tag.

\* \* \* \* \*